March 21, 1939.  W. E. BELCHER  2,151,401
ELECTRIC TOASTER
Filed Feb. 15, 1936   2 Sheets-Sheet 1

INVENTOR.
Walter E. Belcher
BY
ATTORNEYS.

March 21, 1939. W. E. BELCHER 2,151,401
ELECTRIC TOASTER
Filed Feb. 15, 1936 2 Sheets-Sheet 2

INVENTOR.
Walter E. Belcher
BY
ATTORNEYS.

Patented Mar. 21, 1939

2,151,401

UNITED STATES PATENT OFFICE 2,151,401

ELECTRIC TOASTER

Walter E. Belcher, Seattle, Wash., assignor to Electrical Safety Appliance Co. Inc., Seattle, Wash., a corporation of Washington Application February 15, 1936, Serial No. 64,127

3 Claims. (Cl. 219—19)

This invention relates to electrical appliances and particularly is directed to an electric toaster. The primary object of the invention is to so perfect a toaster as to render the same fully automatic and otherwise eliminate deficiencies which render toasters as heretofore developed objectionable.

More particularly stated, it is an object of my invention to provide a toaster capable of handling substantially any desired number of bread slices and which requires no attention other than the placing of such slices upon a receiving platform from which the slices are successively fed through the toaster.

It is a further and particular object to provide a toaster in which the desired degree of toasting is obtained through a regulation of the effective heat applied to the bread slices rather than by a regulation of the time duration of the toasting operation.

A still further and particular object of my invention is to provide a toaster in which the toasting action is initiated only in response to the projection of a predetermined heat from the electric elements, thereby assuring uniformity in the first as well as succeeding slices introduced to the toaster.

It is a still further and particular object to provide element boxes so designed as to prevent sagging of the elements in response to heat-influenced expansion of the same.

Further objects and advantages, together with the foregoing, will appear in the course of the following detailed description and claims, the invention consisting in the novel construction, adaptation, and combination of parts hereinafter described and claimed.

Figure 2:
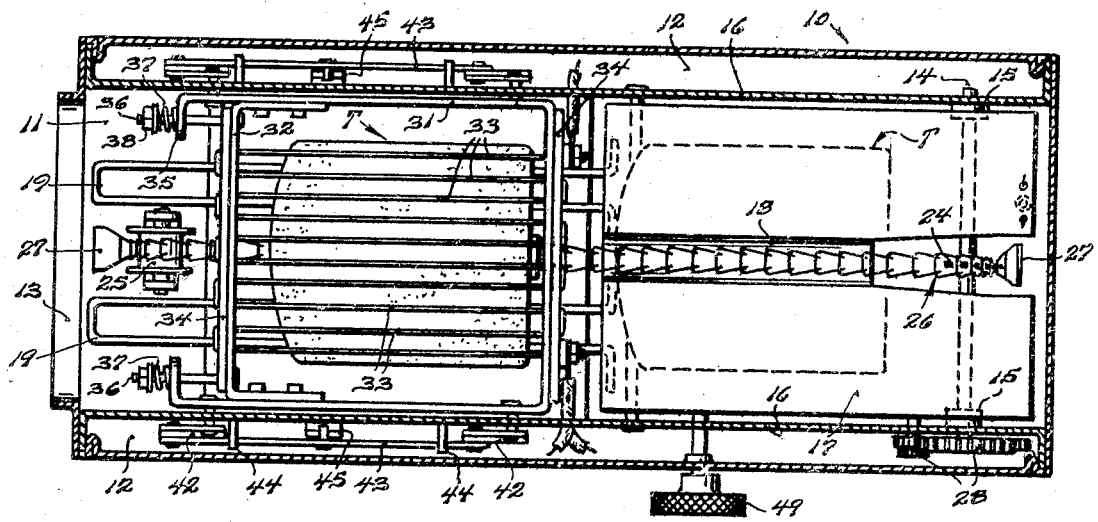
Fig. 2 is a horizontal section thereof taken on the line 2—2 of Fig. 1.
Figure 1:
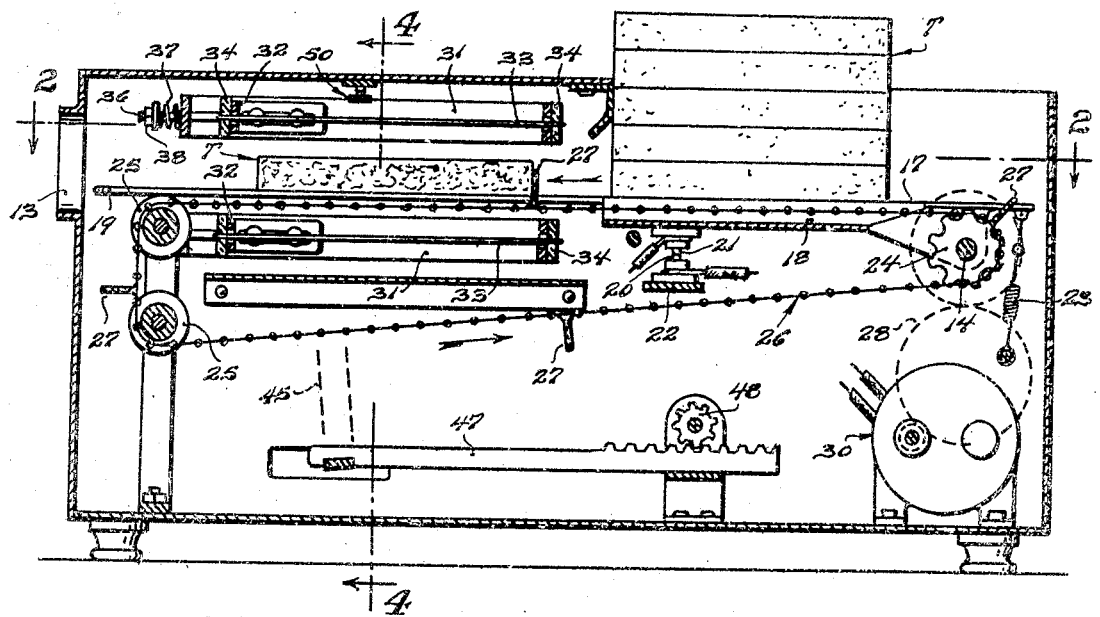
Figure 1 is a longitudinal vertical section through a toaster constructed in accordance with the now preferred embodiment of the invention, the section being taken on the longitudinal median line.
Figure 5:
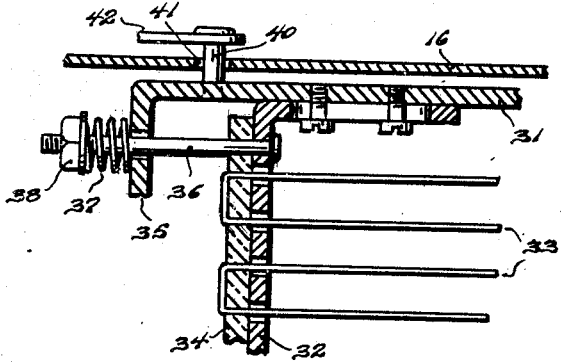
Fig. 5 is a fragmentary horizontal sectional view of the supporting means for the heating elements, the view being taken to an enlarged scale.
Figure 6:
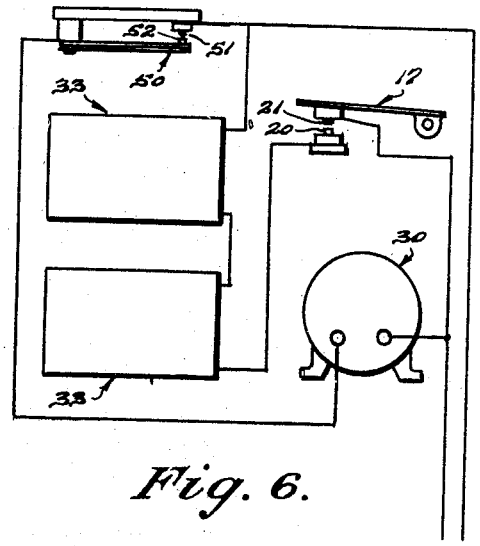
Fig. 6 is a diagrammatic view of the electric circuit employed.
Figure 3:
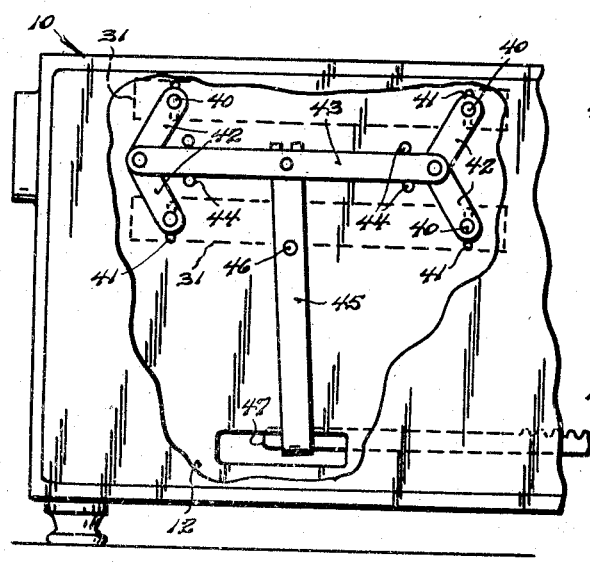
Fig. 3 is a detail side elevational view with a portion of the casing removed to indicate the parallel link mechanism employed to regulate the position of the toasting elements relative to the bread slice.
Figure 4:
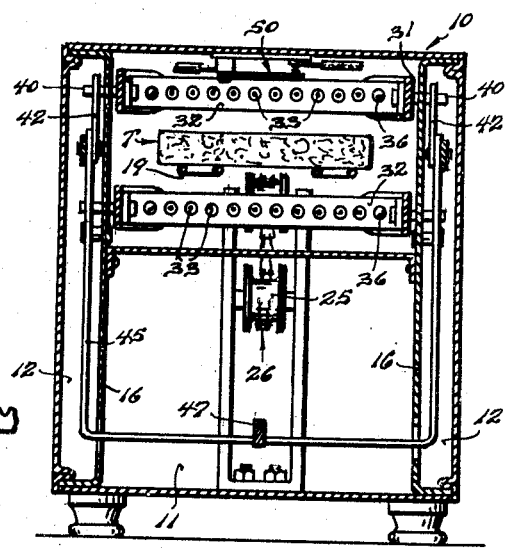
Fig. 4 is a transverse vertical section taken on line 4—4 of Fig. 1.

In said drawings, the numeral 10 represents a casing providing a chamber 11 extending the length of the casing and desirably formed with closed secondary chambers 12 at each side. To clarify the description, said main chamber 11 may be considered as providing communicating compartments at opposite ends, one of which constitutes a supply chamber for the bread slices and the other a heating chamber through which the bread slices are successively delivered from the supply chamber for toasting the same. Said heating compartment is formed with a top wall and in the end wall of the same a discharge throat 13 is provided.

Provided in the supply compartment as a floor for supporting the bread slices is a platform 17 and I pivotally support the same at one end over a horizontal shaft 14 journaled in bearings 15 to extend transversely of the chamber, the platform being formed at its approximate mid-width with a longitudinally extending depressed channel-way 18. At opposite sides of the platform and projecting forwardly to the discharge throat 13 are wire extensions 19 disposed flush with the platform surface.

As will be hereinafter more fully described, a forward support for said platform comprises a switch mechanism consisting in circuit-closing terminals 20 and 21, the terminal 20 being carried by a stationary transverse bar 22 and the terminal 21 being mounted on the underside of the platform, an extension spring 23 engaging the rear terminus of the platform for normally elevating the terminal 21 out of circuit-closing contact with the terminal 20.

Revolubly carried by said shaft 14 to locate the same in the longitudinal plane of the channelway 18 is a sprocket wheel 24. At the opposite end of the chamber and longitudinally aligned with the sprocket wheel 24 are a pair of vertically spaced idler wheels 25, said wheels 24 and 25 receiving an endless chain 26 which, at spaced intervals, is formed with medially located conveyor arms 27. Through the medium of intermeshing reduction gearing 28, said shaft is driven from an electrically-energized motor 30.

Supported in said forward heating compartment of the main chamber 11 to lie above and below the wire extensions of the platform 17 are horizontally disposed and vertically adjustable element boxes comprised of a main U-shaped frame 31 in the open end of which an end bar 32 is slidably mounted, said end bar and the end wall of the frame 31 being apertured at transversely spaced intervals to receive heating elements as 33. Suitable insulating plates are indicated at 34. Said slide mounting of one end wall of the element box peculiarly acts to accommodate expansion and contraction of the elements under the influence of heat and, to maintain tension on the sliding bar, the main frame of the box is formed with inturned terminal fingers 35 apertured for the passage of threaded pins 36 extending from the sliding bar and receiving tension springs 37 over the exposed ends. The tension of the springs is regulated by adjusting nuts 38 threaded on the pins.

As respects the referred-to vertical adjustment of the element boxes, I provide supporting pins 40 at each end which extend laterally through vertical slots 41 in the side walls into the secondary chambers at each side of the casing, operating mechanism in the respective secondary chambers comprising pairs of parallel links 42 actuated by a horizontal bar 43 slidably received in a peg mounting 44. A lever 45 fulcrumed as at 46 engages said bar and is in turn operated from a sliding rack-bar 47 the teeth of which are in mesh with a gear 48. A knurled handle 49 or other suitable operating lever for actuating said gear projects exteriorly of the casing and is or may be provided with a pointer for locating the same in desired positions.

Particularly with respect to the electric circuit for the heating elements, the terminal 21 connects with one pole of a plug while the terminal 20 leads through the heating elements 33 to the opposite pole of the plug, the electric circuit for the chain-actuating motor being independent and including a circuit-closing bi-metallic switch 50 which is supported above the heating elements within the heating compartment of the toaster whereby to obtain a closing of the terminals 51 and 52 thereof only in response to the development of a predetermined heat within the heating compartment.

In operating the toaster, any desired number of bread slices represented by the letter T are introduced through the open end of the casing over the platform 17, acting to depress the platform to obtain circuit-closing contact of the switch terminals 20 and 21 whereby to complete an electric circuit through the elements 33. Coincident with the expansion of the elements under their developed heat of resistance, the springs 37 express the pins 36 outwardly to maintain the elements taut and, as the elements reach their maximum heating efficiency, the bi-metallic switch is caused to bend in response to the greater expansion of one metal relative to the other and effects circuit-closing contact between the terminals 51 and 52 to complete an electric circuit through the motor 30. Motor 30 drives the conveyor chain to successively feed the bread slices through the heating compartment, the toast being discharged through throat 13. The degree of toasting is governed by moving the element boxes directively to or from the plane of travel of the bread slices. As the final bread slice is toasted and discharged from the wire extensions 19 of the platform, spring 23 elevates the platform to deenergize the element circuit through an opening of the switch terminals 20 and 21, the contraction of the elements compressing the springs 37 and the bi-metallic switch subsequently breaking contact between terminals 51 and 52 to open the motor circuit.

The invention is believed clear from the foregoing description of the preferred illustrated embodiment. Modifications will readily suggest themselves and I accordingly intend that the appended claims be given the breadth in their construction which is commensurate with the scope of the invention within the art.

What I claim, is:

1. In a toaster, in combination a toasting compartment having electric-heat-generating means therein, a normally incomplete electric circuit including said heat-generating means, mechanism for delivering a bread slice into toasting position within the toasting compartment, electrically controlled means for operating said delivery mechanism, a normally incomplete electric circuit including said operating means, a switch acting to complete the first-named circuit operated automatically by the weight of a bread slice introduced to the delivery mechanism, and a switch acting to complete the last-named circuit operated automatically in response to the development of a predetermined heat within the toasting compartment.

2. In a toaster, in combination with a toasting compartment, mechanical means for feeding the work to and discharging the work from the compartment, means co-active therewith for operating the feed means only in response to the development of a predetermined heat within the toasting compartment, and means associated with each of said means and acting directly upon the last-named means for automatically terminating the work-feeding operation following the discharge of the work from the toasting compartment.

3. In a toaster, a toasting compartment, electric heating elements supported therein, a normally open electric circuit including said heating elements, electrically operated feed mechanism for introducing the work from a supply compartment therefor to the toasting compartment, a normally open electric circuit including the operating means for the feed mechanism, and means the operation of which is automatically initiated by introduction of work to the supply compartment for closing said circuits successively to energize the heating elements in advance of the energizing of said operating means for the feed mechanism.

WALTER E. BELCHER.